C. STORER.
Lacing-Studs for Boots and Shoes.

No. 217,494. Patented July 15, 1879.

Witnesses.
George Akerman
John W. Storer

Inventor.
Charles Storer

UNITED STATES PATENT OFFICE.

CHARLES STORER, OF CAMBRIDGEPORT, MASSACHUSETTS.

IMPROVEMENT IN LACING-STUDS FOR BOOTS AND SHOES.

Specification forming part of Letters Patent No. 217,494, dated July 15, 1879; application filed March 26, 1879.

*To all whom it may concern:*

Be it known that I, CHARLES STORER, of Cambridgeport, State of Massachusetts, have invented Improvements in the Manufacture of Boot or Shoe Lace Studs, of which the following is a specification.

The object of my invention is to form shoe-lace studs or hooks in such a manner that they shall be very strong in the parts where the greatest strain comes; also, to simplify the operations through which they pass in manufacturing them, thus producing cheap though durable studs or hooks to pass laces around in lacing up boots or shoes, as shown in the accompanying drawings, which form part of this specification.

Figure 1:
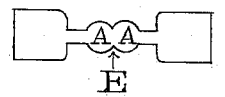
Figure 2:
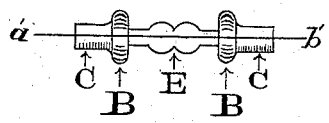
Figure 3:
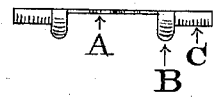
Figure 4:
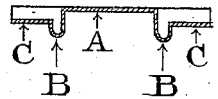
Figure 5:
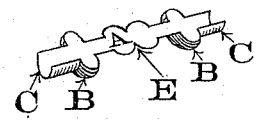
Figure 6:
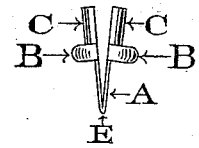
Figure 7:
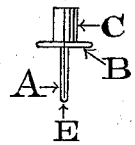
Figure 8:
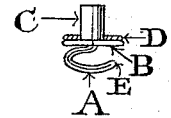
Figure 9:
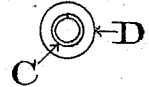

Figure 1 is a plan view of a blank cut from strips of sheet metal. Fig. 2 is a plan view of same blank stamped or pressed at each end into a semicircular shape, being deeper at the points B B than at points C C. Fig. 3 is a side elevation of same, showing external shape of B and C after stamping. Fig. 4 is a section of same through line $a'$ $b'$. Fig. 5 is a perspective view of same, showing clearly the shape of end C and shoulder B; Fig. 6, side elevation of same when it is doubled over at point E, which brings the ends C C and shoulders B B opposite each other. Fig. 7 shows shoulder B flattened down and both sides of tongue A compressed closely together. Fig. 8 is a shoe-lace stud or hook completely formed, showing a sectional view of washer D round shank C, which keeps the shank C from opening, accidentally or otherwise. Fig. 9 is a plan view of stud or hook underneath, showing shank C held together by washer D.

Similar letters of reference indicate like parts.

The method of manufacturing my boot-lace studs and the various operations through which they pass I will now describe, viz:

I first cut blanks of sheet metal the shape and configuration of Fig. 1, and the circular parts A A subsequently become the head or top of the shoe-lace stud. Of course the shape of this blank can be altered to any desired form without changing the spirit of this invention, the result being merely to alter the shape of the hook. The sheet-metal blanks are then placed between dies and stamped or pressed into a semicircular shape at each end, as at C C and B B, the parts C C ultimately forming the shank of the boot-lace stud, and the parts B B making a shoulder, which rests on the outer side of the boot. These operations may be reversed by stamping the ends first and cutting them the required shape afterward, and in this manner produce the same result.

The next operation is to fold or double the two halves together at the point E, as shown in Fig. 6. This brings the ends C C and the shoulders B B opposite each other, and by further compression the shoulder B is flattened down and both sides of the tongue A pressed tightly together. The tongue A is then placed in dies of such shape and configuration as to bend the tongue A into the shape of a hook, as in Fig. 8, and the centers of both the circular parts A A in Fig. 1 become the centers, or thereabout, of the head or top of the boot-lace stud; the parts C C become the shank, which passes through the leather and clinches at its outer end inside the boot or shoe; and the parts B B become a shoulder, which rests on the outer side of the boot.

Although I prefer to make my boot and shoe lace studs in two halves and bend them over at point E, as above described, I am fully aware that a similar shoe-lace stud can be made in three or more sections by cutting the blanks a suitable shape and stamping the ends of such configuration that when they meet they will form a circular shank or tube similar to the one I make in two halves without departing from the spirit of my invention.

It will be seen that the tongue A or hook of my shoe-lace stud has two layers of metal, and I claim it is stronger in consequence where the strain of a tightened lace comes than any stud now made from sheet metal.

If necessary, I can place another layer of sheet metal between the tongue A, or put an additional layer or cap over it or under it to strengthen it.

It is also stronger than those shoe-lace studs made from solid brass wire, for these are so rigid that they will break rather than bend.

I claim as my invention—

1. A lacing hook or stud provided with a hook, A, of two thicknesses of metal, a shoulder, B, and shank C, all from a blank, substantially as shown and described.

2. A lacing hook or stud provided with the hook, of two thicknesses of metal, the shoulder B, shank C, and washer D, all substantially as shown and described.

CHARLES STORER.

Witnesses:
GEORGE AKERMAN,
JOHN W. STORER.